US009024952B2

(12) United States Patent
Mital et al.

(10) Patent No.: US 9,024,952 B2
(45) Date of Patent: May 5, 2015

(54) DISCOVERING AND CONFIGURING REPRESENTATIONS OF DATA VIA AN INSIGHT TAXONOMY

(75) Inventors: Vijay Mital, Kirkland, WA (US); Darryl Ellis Rubin, Duvall, WA (US); Suraj T. Poozhiyil, Redmond, WA (US); David G. Green, Redmond, WA (US)

(73) Assignee: Microsoft Technology Licensing, Inc., Redmond, WA (US)

( * ) Notice: Subject to any disclaimer, the term of this patent is extended or adjusted under 35 U.S.C. 154(b) by 532 days.

(21) Appl. No.: 12/972,144

(22) Filed: Dec. 17, 2010

(65) Prior Publication Data
US 2012/0154402 A1 Jun. 21, 2012

(51) Int. Cl.
G06T 11/20 (2006.01)
(52) U.S. Cl.
CPC .................... G06T 11/206 (2013.01)
(58) Field of Classification Search
None
See application file for complete search history.

(56) References Cited

U.S. PATENT DOCUMENTS

| | | | |
|---|---|---|---|
| 4,633,430 | A | 12/1986 | Cooper |
| 5,669,007 | A | 9/1997 | Tateishi |
| 6,326,962 | B1 * | 12/2001 | Szabo .......................... 715/762 |
| 6,512,530 | B1 | 1/2003 | Rzepkowski et al. |
| 6,691,100 | B1 | 2/2004 | Alavi et al. |
| 6,865,720 | B1 | 3/2005 | Otani et al. |
| 6,931,589 | B2 | 8/2005 | Baltsan et al. |
| 6,995,768 | B2 | 2/2006 | Jou |
| 7,028,306 | B2 | 4/2006 | Boloker et al. |
| 7,263,663 | B2 | 8/2007 | Ballard et al. |
| 7,315,305 | B2 | 1/2008 | Crotty |
| 7,315,861 | B2 | 1/2008 | Seibel et al. |
| 7,343,585 | B1 | 3/2008 | Lau et al. |
| 7,349,947 | B1 | 3/2008 | Slage et al. |
| 7,440,902 | B2 | 10/2008 | Greenstein et al. |
| 7,506,243 | B2 | 3/2009 | Kotler et al. |
| 7,603,620 | B2 | 10/2009 | Erol et al. |
| 7,672,950 | B2 | 3/2010 | Eckardt, III |

(Continued)

OTHER PUBLICATIONS

Tory, M. et al. "Rethinking Visualization: A High-Level Taxonomy"—Published Jan. 2005; http://citeseerx.ist.psu.edu/viewdoc/download?doi=10.1.1.94.2968&rep=repl&type=pdf.

(Continued)

*Primary Examiner* — Hau Nguyen
*Assistant Examiner* — Ryan M Gray
(74) *Attorney, Agent, or Firm* — Kevin Sullivan; Kate Drakos; Mickey Minhas

(57) ABSTRACT

An insight that a user desires to obtain from graphically presenting and manipulating a data set may be identified. A graphical object may be selected for representation and analysis of the data set based on whether the graphical object is capable of revealing the desired insight. The selection may be made based visual characteristic(s) of the graphical object and parameters, such as a type, of data in the data set. Different graphical objects may be selected to gain different insights about the data set. For example, a bar chart may be selected to gain an insight such as a trend in the data. The selected graphical object may be provided as a suggestion on a user interface for potentially using the graphical object to represent the data. A graphical object may include visually interactive components for use within a graphical user interface. The interactive components may be used to receive user input indicating a change in representation of the data set so that appearance of visual characteristics of the graphical object is modified to reflect the change.

20 Claims, 7 Drawing Sheets

(56) References Cited

U.S. PATENT DOCUMENTS

| | | | |
|---|---|---|---|
| 7,752,314 B2 | 7/2010 | Trevor et al. | |
| 7,752,536 B2 | 7/2010 | Megiddo et al. | |
| 7,802,230 B1 | 9/2010 | Mendicino et al. | |
| 7,900,111 B1 | 3/2011 | Kim et al. | |
| 7,908,186 B2 | 3/2011 | Gabelmann et al. | |
| 8,135,655 B2 | 3/2012 | Oaten et al. | |
| 8,301,585 B2* | 10/2012 | Mourey et al. | 707/603 |
| 8,332,772 B2 | 12/2012 | Janzen et al. | |
| 8,473,473 B2 | 6/2013 | Wang et al. | |
| 8,589,172 B2 | 11/2013 | Alonso et al. | |
| 8,635,211 B2 | 1/2014 | Jiang et al. | |
| 2001/0047372 A1 | 11/2001 | Gorelik et al. | |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0143800 A1 | 10/2002 | Lindberg et al. | |
| 2002/0169658 A1 | 11/2002 | Adler | |
| 2002/0191199 A1 | 12/2002 | Imada et al. | |
| 2003/0040962 A1 | 2/2003 | Lewis | |
| 2003/0041104 A1 | 2/2003 | Wingard et al. | |
| 2003/0144868 A1 | 7/2003 | MacIntyre et al. | |
| 2004/0015481 A1 | 1/2004 | Zinda | |
| 2004/0098358 A1 | 5/2004 | Roediger | |
| 2004/0153992 A1 | 8/2004 | Molina-Moreno et al. | |
| 2004/0162842 A1 | 8/2004 | Ono et al. | |
| 2004/0163039 A1 | 8/2004 | Gorman | |
| 2004/0181519 A1 | 9/2004 | Anwar | |
| 2005/0004911 A1 | 1/2005 | Goldberg et al. | |
| 2005/0043961 A1 | 2/2005 | Torres et al. | |
| 2005/0187809 A1 | 8/2005 | Falkenhainer | |
| 2005/0231392 A1 | 10/2005 | Meehan et al. | |
| 2006/0074882 A1 | 4/2006 | Scherer et al. | |
| 2006/0080400 A1 | 4/2006 | Guha | |
| 2006/0107211 A1 | 5/2006 | Mirtich et al. | |
| 2007/0005477 A1 | 1/2007 | McAtamney | |
| 2007/0038657 A1 | 2/2007 | Denton et al. | |
| 2007/0046664 A1 | 3/2007 | Raspl et al. | |
| 2007/0061711 A1 | 3/2007 | Bodin et al. | |
| 2007/0112714 A1 | 5/2007 | Fairweather | |
| 2007/0124285 A1 | 5/2007 | Wright et al. | |
| 2007/0136326 A1 | 6/2007 | McClement et al. | |
| 2007/0179941 A1 | 8/2007 | Huang et al. | |
| 2007/0185746 A1 | 8/2007 | Chieu et al. | |
| 2007/0250764 A1 | 10/2007 | Jiang | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0058969 A1 | 3/2008 | Nixon et al. | |
| 2008/0178083 A1 | 7/2008 | Bergman et al. | |
| 2008/0183710 A1 | 7/2008 | Serjeantson et al. | |
| 2008/0184140 A1 | 7/2008 | Koerner | |
| 2008/0184167 A1 | 7/2008 | Berrill et al. | |
| 2008/0189438 A1 | 8/2008 | Zimmerer et al. | |
| 2008/0195930 A1 | 8/2008 | Tolle | |
| 2008/0209314 A1 | 8/2008 | Sylthe et al. | |
| 2008/0215559 A1 | 9/2008 | Fontoura et al. | |
| 2008/0238925 A1 | 10/2008 | Meehan et al. | |
| 2008/0271127 A1 | 10/2008 | Naibo et al. | |
| 2008/0288889 A1 | 11/2008 | Hunt et al. | |
| 2008/0294996 A1 | 11/2008 | Hunt et al. | |
| 2008/0306981 A1 | 12/2008 | Jiang et al. | |
| 2008/0307334 A1 | 12/2008 | Chaudhri et al. | |
| 2008/0319829 A1 | 12/2008 | Hunt et al. | |
| 2009/0037363 A1 | 2/2009 | Kozlov et al. | |
| 2009/0049422 A1 | 2/2009 | Hage et al. | |
| 2009/0094674 A1 | 4/2009 | Schwartz et al. | |
| 2009/0100360 A1 | 4/2009 | Janzen et al. | |
| 2009/0100407 A1 | 4/2009 | Bouillet et al. | |
| 2009/0125553 A1 | 5/2009 | Dickinson | |
| 2009/0172024 A1 | 7/2009 | Hsu et al. | |
| 2009/0172773 A1 | 7/2009 | Moore | |
| 2009/0216758 A1 | 8/2009 | Tuttle et al. | |
| 2009/0225082 A1 | 9/2009 | Hargrove et al. | |
| 2009/0254971 A1 | 10/2009 | Herz et al. | |
| 2009/0287814 A1 | 11/2009 | Robertson et al. | |
| 2009/0300544 A1 | 12/2009 | Psenka et al. | |
| 2009/0312992 A1 | 12/2009 | Chen et al. | |
| 2009/0322739 A1 | 12/2009 | Rubin et al. | |
| 2009/0327878 A1 | 12/2009 | Grandison et al. | |
| 2010/0005420 A1 | 1/2010 | Schneider | |
| 2010/0049686 A1* | 2/2010 | Gotz et al. | 706/47 |
| 2010/0057753 A1* | 3/2010 | Gotz et al. | 707/100 |
| 2010/0070448 A1 | 3/2010 | Omoigui | |
| 2010/0070489 A1 | 3/2010 | Aymeloglu et al. | |
| 2010/0088258 A1 | 4/2010 | Oaten et al. | |
| 2010/0100561 A1 | 4/2010 | Cooper et al. | |
| 2010/0106853 A1 | 4/2010 | Kashiyama et al. | |
| 2010/0131255 A1 | 5/2010 | Beckman et al. | |
| 2010/0138753 A1 | 6/2010 | Riggs et al. | |
| 2010/0179951 A1 | 7/2010 | McPhail | |
| 2010/0198697 A1 | 8/2010 | Brown et al. | |
| 2010/0199181 A1 | 8/2010 | Robertson | |
| 2010/0205178 A1 | 8/2010 | Bush et al. | |
| 2010/0205238 A1* | 8/2010 | Cao et al. | 709/203 |
| 2010/0241620 A1 | 9/2010 | Manister et al. | |
| 2010/0287459 A1 | 11/2010 | Mital et al. | |
| 2011/0029636 A1 | 2/2011 | Smyth et al. | |
| 2011/0072046 A1 | 3/2011 | Chi | |
| 2011/0078101 A1* | 3/2011 | Gotz et al. | 706/46 |
| 2011/0078160 A1* | 3/2011 | Gotz et al. | 707/750 |
| 2011/0093430 A1 | 4/2011 | B'Far et al. | |
| 2011/0131253 A1 | 6/2011 | Peukert et al. | |
| 2011/0179020 A1 | 7/2011 | Ozzie et al. | |
| 2011/0231385 A1 | 9/2011 | Wang et al. | |
| 2011/0295795 A1 | 12/2011 | Venkatasubramanian et al. | |
| 2011/0295853 A1 | 12/2011 | Li et al. | |
| 2011/0314007 A1 | 12/2011 | Dassa et al. | |
| 2012/0158643 A1 | 6/2012 | Mital et al. | |
| 2012/0158644 A1 | 6/2012 | Mital et al. | |
| 2012/0158732 A1 | 6/2012 | Mital et al. | |
| 2012/0158754 A1 | 6/2012 | Mital et al. | |
| 2012/0159312 A1 | 6/2012 | Mital et al. | |
| 2012/0159333 A1 | 6/2012 | Mital et al. | |
| 2012/0159465 A1 | 6/2012 | Mital et al. | |

OTHER PUBLICATIONS

"Document Processing System", Published On: Nov. 16, 2007, Available at: http://www.wolfram.com/products/mathematica/analysis/content/DocumentProcessingSystems.html.

"How to Customize Ubuntu into Your Own Custom Distribution", Retrieved Date: Nov. 26, 2010, Available at: http://www.linuxquestions.org/questions/ubuntu-63/how-to-customize-ubuntu-into-your-own-custom-distribution-663412/.

"Introduction to the XML Pipeline Definition Language (XPL)", Retrieved Date: Sep. 16, 2010, Available at: https://web.archive.org/web/20100115060615/http://www.orbeon.com/orbeon/doc/reference-xpl-pipelines.

"LeoStatistic-building Histogram, Curve Fit, Multivariate Regression, Data Modeling Software", Retrieved Date: Sep. 21, 2010, Available at: http://www.leokrut.com/leostatistic/index.html.

"Optimizing Forms Processing", Retrieved On: Sep. 16, 2010, Available at: https://web.archive.org/web/20111102193750/http://www.movetonow.com/content/optimizing_forms_processing.

"Publishing Applications to Market Place", Retrieved Date: Nov. 26, 2010, Available at: https://help.creator.zoho.com/Publishing-applications-to-market-place.html.

"Quella Business Intelligence Package", Retrieved Date: Sep. 21, 2010, Available at: http://www.shareit.com/product.html?cookies=1&productid=300110398&affiliateid=2000122751.

"Square Your Search Results with Google Squared", Published on: Jun. 3, 2009, Available at: http://googleblog.blogspot.com/2009/06/square-your-search-results-with-google.html.

"User Customization", Retrieved Date: Nov. 26, 2010, Available at: http://docstore.mik.ua/orelly/perl3/tk/ch16_01.htm.

"Windows Azure and Cloud Computing for Sep. 8, 2010+", Published on: Sep. 9, 2010, Available at: http://oakleafblog.blogspot.in/2010/09/windows-azure-and-cloud-computing-posts_09.html.

Ayachit, et al., "Customizing ParaView", Published on: Oct. 2009, Available at: http://www.itk.org/Wiki/images/7/77/Branding_paper.pdf.

(56) References Cited

OTHER PUBLICATIONS

Banerjee, Atanu, "The 2007 Microsoft Office System and Other Platform Technologies for Building Composite Applications", Published on: Dec. 2006, Available at: http://msdn.microsoft.com/enus/library/bb220802.aspx.

Page, Sam, "XSL Pipeline Processing", Retrieved on: Sep. 16, 2010, Available at: http://www.usingxml.com/Transforms/XslPipelines.

Frisch, et al., "Streaming XML Transformations Using Term Rewriting", In PLAN—X—Programming Language Technologies for XML, Jan. 20, 2007, 13 Pages.

Gardarin, et al., "XML-based Components for Federating Multiple Heterogeneous Data Sources", In Proceedings of the 18th International Conference on Conceptual Modeling, Nov. 15, 1999, 14 Pages.

Jelinek, et al., "XML Visualization Using Tree Rewriting", In Proceedings of the 20th Spring Conference on Computer Graphics, Apr. 22, 2004, pp. 65-72.

Biddick, Michael, "Six Questions to Ask Before Buying End-to-End APM", Published on: Jun. 21, 2010, Available at: http://www.networkcomputing.com/applications/six-questions-to-ask-before-buying-end-to-end-apnla/d-id/1231626?.

"Non-Final Office Action Received for U.S. Appl. No. 12/972,249", Mailed Date: Jul. 31, 2014, 30 Pages.

Delaney, Andrew, "Direct Data Feed Services", Retrieved on: Jun., 2010, Available at: http://www.ateamgroup.com/?dlid=7460&dlcm=on&dlla=O&dlls=0.

Hibino, et al., "Processing Incremental Multidimensional Range Queries in a Direct Manipulation Visual Query Environment", In Proceedings of the IEEE 14th International Conference on Data Engineering, Feb. 1998, 8 Pages.

Janeiro, "Improving the Development of Service-Based Applications Through Service Annotations", In Proceedings of IADIS WWW/Internet, 2009, 8 Pages.

Johnson, et al., "Building ETL Processes for Business Intelligence Solutions", Published On: Oct. 2008, Available at: http://erwin.com/content/whitepapers/ca_erwin_building_etl_processes_sql.pdf.

Mostarda, et al., "MU: An Hybrid language for Web Mashups", In Proceedings of the International World Wide Web Conference, Apr. 24, 2009, 10 Pages.

Nagel, Nick, "Enterprise Data Modeling Using XML Schema", In White paper of Altova, Dec. 2007, 30 Pages.

Ravindran, Karthik, "Integrating LOB Systems with the Microsoft Office System", Published on: Nov. 2007, Available at: https://msdn.microsoft.com/en-us/library/bb896607.aspx.

Spillner, "Flexible Human Service Interfaces", In Proceedings of the ICEIS vol. 5, Jun. 2007, pp. 79-85.

Webb, et al., "The In-Context Slider: A Fluid Interface Component for Visualization and Adjustment of Values while Authoring", In Proceedings of the Working Conference on Advanced Visual Interfaces, May, 2008, 9 Pages.

White, Colin J., "IBM Enterprise Analytics for the Intelligent e-business", Published on: Sep. 2001, Available at: ftp://129.35.224.112/software/data/informix/pubs/papers/bisolution/bisolution.PDF.

Yi, et al "Dust & Magnet: Multivariate Information Visualization using a Magnet Metaphor", In Information Visualization, vol. 4, Oct. 2005, 29 Pages.

Evans, Will, "Dynamic Visualization: Introduction & Theory", Published on: Jun. 1, 2009, Available at: https://web.archive.org/web/20090609074938/http://blog.semanticfoundry.com/2009/06/01/dynamic-visualization-introduction-theory.

McNee, Bart, "Creating Auction Ads for Marketplaces", Published on: Apr. 2007, Available at: https://web.archive.org/web/20070812221237/http://www.e-articles.info/e/a/title/Creating-Auction-Ads-for-Marketplaces/.

"Final Office Action Received for U.S Appl. No. 12/819,493", Mailed Date: Aug. 15, 2012, 17 Pages.

"Final Office Action Received for U.S Appl. No. 12/819,493", Mailed Date: Nov. 5, 2013, 21 Pages.

"Non-Final Office Action Received for U.S Appl. No. 12/819,493", Mailed Date: Mar. 30, 2012, 16 Pages.

"Non-Final Office Action Received for U.S Appl. No. 12/819,493", Mailed Date: Apr. 10, 2013, 17 Pages.

"Non-Final Office Action Received for U.S Appl. No. 12/819,493", Mailed Date: Mar. 21, 2014, 21 Pages.

"Notice of Allowance Received for U.S Appl. No. 12/819,493", Mailed Date: Oct. 14, 2014, 15 Pages.

"Final Office Action Received for U.S Appl. No. 12/971,462", Mailed Date: Sep. 18, 2013, 25 Pages.

"Non-Final Office Action Received for U.S Appl. No. 12/971,462", Mailed Date: Mar. 21, 2013, 22 Pages.

"Final Office Action Received for U.S Appl. No. 12/971,638", Mailed Date: Feb. 25, 2014, 12 Pages.

"Non Final Office Action Received for U.S Appl. No. 12/971,638", Mailed Date: Nov. 18, 2014, 12 Pages.

"Non Final Office Action Received for U.S Appl. No. 12/971,638", Mailed Date: Aug. 30, 2012, 19 Pages.

"Final Office Action Received for U.S Appl. No. 12/971,685", Mailed Date: Oct. 11, 2012, 16 Pages.

"Non Final Office Action Received for U.S Appl. No. 12/971,685", Mailed Date: Nov. 20, 2014, 18 Pages.

"Non-Final Office Action Received for U.S Appl. No. 12/971,685", Mailed Date: Jul. 13, 2012, 11 Pages.

"Non-Final Office Action Received for U.S Appl. No. 12/971,685", Mailed Date: Apr. 24, 2014, 16 Pages.

"Final Office Action Received for U.S Appl. No. 12/971,725", Mailed Date: May 1, 2013, 14 Pages.

"Final Office Action Received for U.S Appl. No. 12/971,725", Mailed Date: Jan. 15, 2015, 20 Pages.

"Non-Final Office Action Received for U.S Appl. No. 12/971,725", Mailed Date: Jun. 23, 2014, 19 Pages.

"Final Office Action Received for U.S Appl. No. 12/971,782", Mailed Date: Jan. 31, 2013, 11 Pages.

"Final Office Action Received for U.S Appl. No. 12/971,782", Mailed Date: Dec. 4, 2014, 13 Pages.

"Non-Final Office Action Received for U.S Appl. No. 12/971,782", Mailed Date: Apr. 10, 2014, 11 Pages.

"Non-Final Office Action Received for U.S Appl. No. 12/971,782", Mailed Date: Jul. 13, 2012, 8 Pages.

"Final Office Action Received for U.S Appl. No. 12/972,205", Mailed Date: Jun. 7, 2013, 35 Pages.

"Non-Final Office Action Received for U.S Appl. No. 12/972,205", Mailed Date: Nov. 26, 2012, 33 Pages.

"Non-Final Office Action Received for U.S Appl. No. 12/971,725", Mailed Date: Aug. 21, 2012, 11 Pages.

\* cited by examiner

DISCOVERING AND CONFIGURING REPRESENTATIONS OF DATA VIA AN INSIGHT TAXONOMY

BACKGROUND

Today, people are regularly exposed to large amounts of data and often seek to manipulate such data in a number of ways. Computing environments provide the ability for users to analyze such large amounts of data. In some cases, data is manipulated graphically through a visually interactive user display.

Users often operate computers having processors run with suitable software to gather, organize, manipulate and present data. Spreadsheets, for example, are commonly used to view and analyze large amounts of data. Portions of a data set contained within a spreadsheet may be selected in a manner to create a graphical representation of the data, such as in the form of a chart or graph. For example, data may be input from a spreadsheet into a line graph in a straightforward manner, so that trends along the function set forth by the line graph and determined by the data set can be easily visualized. Data plotted out by the line graph may also be manipulated, in turn, by altering features of the line graph and/or dimensions of the data set itself.

SUMMARY

The subject matter relates generally to analyzing a data set and selecting, based on an insight that a user desires to obtain from the data set, a graphical object to allow the user to represent the data set and to interact with the data set, using a graphical user interface. An insight may be revealed to a user by the appearance of the graphical object when the display of that object is controlled by data in the data set. Alternatively or additionally, an insight may be revealed to a user based on an interaction with the graphical object that specifies a change of data within at least one dimension of the data set. When the user provides input indicating a change in the data set, the appearance of the visual display component may change such that the user is likely to gain the insight.

The insight desired by a user may comprise, for example, recognizing one or more trends within the data set, a correlation between a portion of the data set with other portion(s) of the data set, or effects of modification of a portion of the data set into one or more other portions of the data set. The insight may also include a recognition of differences, similarities or contrasts between portions of the data set or any other suitable information that allows the user to get an understanding of an aspect of the data set.

A computer-based system may determine a desired insight based upon input received from a user. Alternatively or additionally, the system may determine a desired insight based on the user's prior interaction with the data set, characteristics of the data set or in other ways.

The type of insight that users may desire to gain from analysis of a data set may be represented in an insight taxonomy. A computerized tool suggesting a graphical object to provide a desired insight may identify a desired insight by making a selection from the taxonomy.

Graphical objects also may be classified in accordance with the insight taxonomy. Accordingly, selecting a graphical object to suggest may entail selecting those components classified in the taxonomy in the same way as the desired user's insight. The suitability of the graphical object for revealing particular insights on a data set may depend on visual characteristic(s) of the visual object. Hence, the position of a graphical object within a taxonomy may depend on visual characteristics of the object. Some graphical objects may be inherently suited for presenting certain types of data to reveal different insights. For example, a bar chart can be subdivided into multiple heights and may therefore be used to represent a data set comprising a large number of data points that together form the whole. The bar chart is also well suited for representing trends. Various visual display components, including arbitrary graphical objects, may be employed for data representation.

Additionally, the selection of a graphical object suitable for revealing a desired insight may be based on a type of data included in the data set. For example, the data may be continuous (e.g., salary, sales, location, etc.), discrete (e.g., a number of employees, products, etc.), or including a mix of continuous and discrete values. Further, the data set may have a different number of values that may be distributed differently, such as it may comprise a small range of values (e.g., calendar values), a large range of values (e.g., sales across a country), or distributed in any other suitable manner. A computer-based system may select graphical objects to suggest to a user by matching characteristics of the data to be displayed with visual characteristics that can be used to represent the data.

In some embodiments, a graphical object may be selected from a library that includes multiple objects, each associated with metadata comprising an insight that can be gained from employing this graphical object to analyze a data set having certain parameters.

In some cases, a graphical object may be matched to the data set based on additional characteristics of the visual display component that are conducive to representing a data set or variations that a user may make in analyzing the data set. Selecting may include matching dimensions of variability of the data set with characteristics of the visual display components that can represent such a change.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
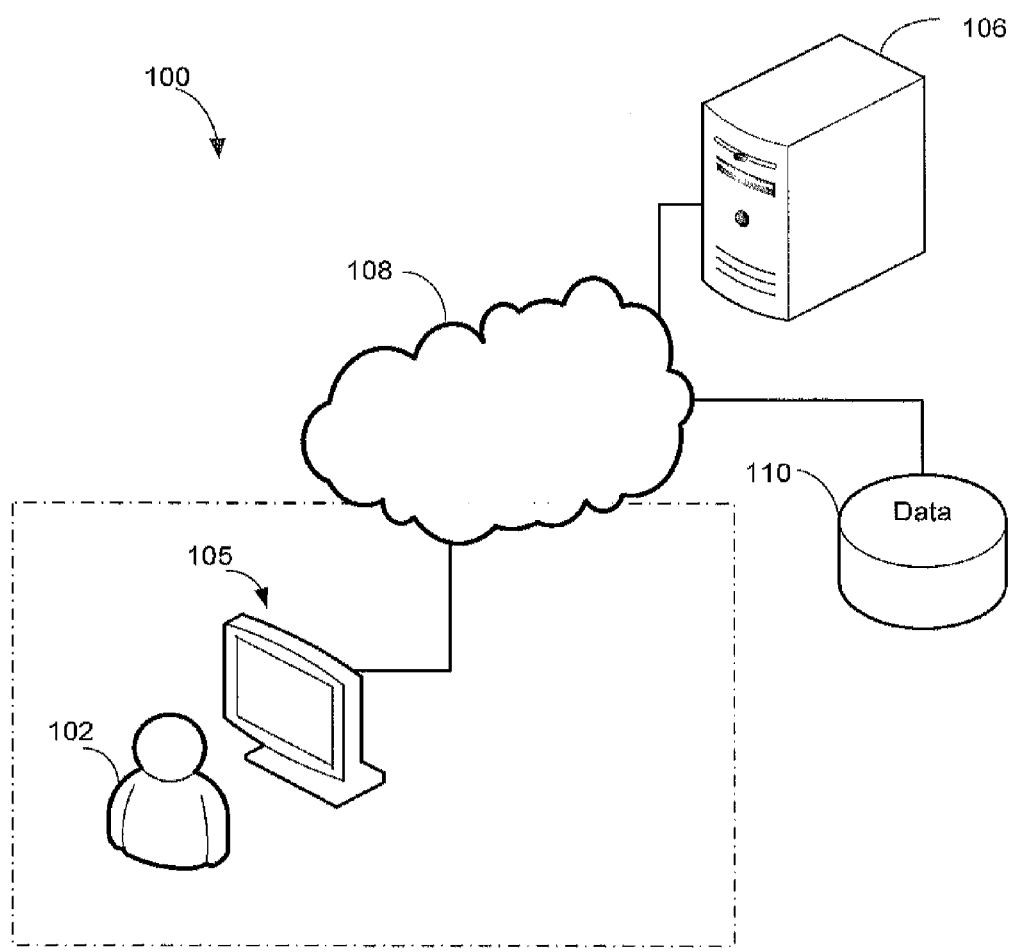
FIG. 1 is a high-level block diagram illustrating a computing environment in which some embodiments may be practiced.

The inventors have recognized and appreciated advantages for users to select graphical objects for data representation that match an insight that the users desire to obtain from data. Users may use computer-based systems to present data through different graphical objects. However, it may not be straightforward for users who are relatively unsophisticated in data display and analysis techniques to select graphical objects suitable to represent particular data in a way that may reveal a desired insight. Accordingly, aspects described herein relate to techniques for identifying an insight that a user desires to gain from analyzing a data set and selecting graphical objects that are suitable for representing the data set so that the insights are revealed.

The insight desired by a user may comprise obtaining an overall impression about a data set being analyzed or may comprise information on an aspect of the data set. For example, the insight desired may comprise recognizing one or more trends within the data set, a correlation between a portion of the data set with other portion(s) of the data set, or effects of modification of a portion of the data set on one or more other portions of the data set. The insight may also include a recognition of differences, similarities or contrasts between portions of the data set or any other suitable information that allows the user to get an understanding of an aspect of the data set.

In some embodiments, the types of desired insights may be classified in an insight taxonomy. In the insight taxonomy, multiple insights may be organized in accordance with a hierarchy, based on their types. The hierarchy may comprise any number of levels of the insights. Further, any suitable types of insights may be classified in the insight taxonomy. For example, insights such "Narrowing and Elaboration," "Differentiating," and "Ensembling" may be high level insights in the hierarchy. Each of these insights may be linked to lower level insights. For example, the "Narrowing and Elaboration" insight may be associated with lower level insights comprising filtering/exclusion, finding similar items (e.g., cameras with similar features or stocks matching a particular stock's breakout pattern), or finding similar items by relationships (e.g., find housing locations with similar demographics, find music that most friends are listening).

In some embodiments, a computerized tool may be used to select and suggest to a user one or more graphical objects that may be used to represent a data set in a way that is likely to reveal the user's desired insight. Graphical objects that may be employed for data representation in accordance with techniques described herein may be any suitable objects, such as different shapes, geometries, and different arbitrary graphical objects. Some graphical objects may be inherently suitable for presenting certain types of data to reveal different insights. For example, a bar chart can be subdivided into multiple heights and may therefore be used to represent a data set that may have a large number of values. The bar chart is also well suitable for representing trends. The selection of the graphical objects may be based on a number of different factors.

In embodiments where the type of an insight that users may desire to gain from analysis of the data set is represented in a taxonomy, the selecting of the graphical objects may entail classifying the desired insight in accordance with the taxonomy. Graphical objects may also be classified in accordance with the insight taxonomy. Accordingly, one or more graphical objects may be selected that are classified in the taxonomy in the same way as the desired user's insight.

Furthermore, the suitability of a graphical object for revealing particular insights of a data set may depend on visual characteristic(s) of the graphical object. Hence, the suitability of a graphical object for providing an insight from a data set may depend on visual characteristics of the graphical object in relation to characteristics of the data set.

For example, graphical objects may have visual characteristics that can map to particular dimensions of the data set. Accordingly, in some embodiments, graphical objects may be selected based on a capability of the graphical objects to present, through its visual characteristics, the desired insights by representing one or more dimensions of the data set.

In some embodiments, the selection of a graphical object suitable for revealing a desired insight may be based on a type of data included in the data set. For example, the data may be continuous (e.g., salary, sales, location, etc.), discrete (e.g., a number of employees, products, etc.), or including a mix of continuous and discrete values. Further, the data set may have a different number of values that may be distributed differently, such as it may comprise a small range of values (e.g., calendar values), a large range of values (e.g., sales across a country), or distributed in any other suitable manner. A computer-based system may limit the selection of visual components to suggest to a user by matching characteristics of the data to be displayed with visual characteristics that can be used to represent the data.

A graphical object may include metadata that provides information on insights that can be revealed from representing data using the graphical object. Such metadata may be provided in any suitable way. For example, it may be provided by a human creator of the graphical object. Alternatively, a processor may analyze the graphical object to recognize visual components of the graphical object that can be repeated, sized, split, colored or otherwise manipulated in a way to reveal an insight. Such an analysis may be performed using pattern matching techniques or other suitable heuristics. The results of such analysis may be recorded as metadata indicating whether the graphical object may be used to reveal a desired insight. The metadata may further comprise information on how data can be bound to characteristics of the graphical object. Accordingly, selection of a suitable graphical object may be based on metadata associated with the objects.

An insight that a user desires to gain from analyzing a data set may be identified in any suitable manner. For example, a computer-based system may determine a desired insight based on input received from a user. A computer-based system may also determine a desired insight based on user's prior interaction with the data set, characteristics of the data set, a type of the data set or in other ways. Such an analysis may be performed by applying heuristics on other suitable computer inference techniques.

When one or more graphical objects that are likely to reveal the desired insight are selected, a user may be presented with a suggestion on a user interface for activating and incorporating one or more graphical objects selected using any of the techniques described above. The suggestion may be presented in any suitable way and format. For example, visual controls, such as interactive icons, menus and other objects may be presented which are capable of receiving input indicative of selection of the respective graphical object.

When a suitable input is received indicative of a selection of a graphical object from the graphical objects presented for the user's selection, the selected graphical object may be implemented on a user interface to reveal the desired insight from a data set. Specifically, the graphical object may be associated with the data set or a portion of the data set so that visual appearance of the graphical object is controlled by the data set or a respective portion of the data set. For example, one or more visual characteristics of the selected graphical object may change when the data set is associated with the graphical object so that the user is likely to obtain the desired insight.

In some embodiments, the graphical object may provide a capability for a user to interact with the graphical object. An insight may therefore be revealed to the user by the appearance of the graphical object when the display of this graphical object is controlled by data in the data set. Alternatively or additionally, the user may manipulate one or more dimensions of the data set through the graphical object to reveal the desired insight. Thus, the desired insight may be revealed to the user based on an interaction with the graphical object that specifies a change of data within at least one dimension of the data set. For example, when the user provides input indicating a change in the data set, the appearance of the graphical object may also change such that the user is likely to gain the insight.

In some embodiments, only a portion of the data set is visually displayed through the selected graphical object. A visual object may be included within the graphical object, representing variable dimensions of the data set. One or more filters or constraints may be applied to the visual characteristics or the data itself to result in an updated graphical object representing the data. After receiving appropriate input, particular items of data in a data set may also be modified through the graphical object.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 105 may also have access to any suitable source of data 110.

In the embodiment of FIG. 1, a data analysis system may execute on server 106, and computer 105 may provide a user interface through which a user may enter inputs and receive results. In some embodiments, user inputs may comprise an insight that user 102 desires to obtain from a data set. Though, the desired insight may be identified in any other suitable manner. It should be appreciated that there is no requirement that the data analysis system execute on a server and it may, for example, execute wholly on computer 105.

Regardless of the type of input provided by user 102 that triggers generation of an input, computing device 105 may send the input to server 106 to obtain information relevant to the input. That information may be obtained from one or more data sets stored in database 110 which is also accessible over network 100. As part of retrieving or generating data relevant to the input, server 106 may select one or more graphical objects that may be used to reveal a desired insight which are then returned to user 102. The information generated by server 106 may be sent over computer network(s) 108 and be displayed on a display of computing device 105. A display may be any suitable display, including an LCD or CRT display, and may be either internal or external to computing device 105.

Figure 2:
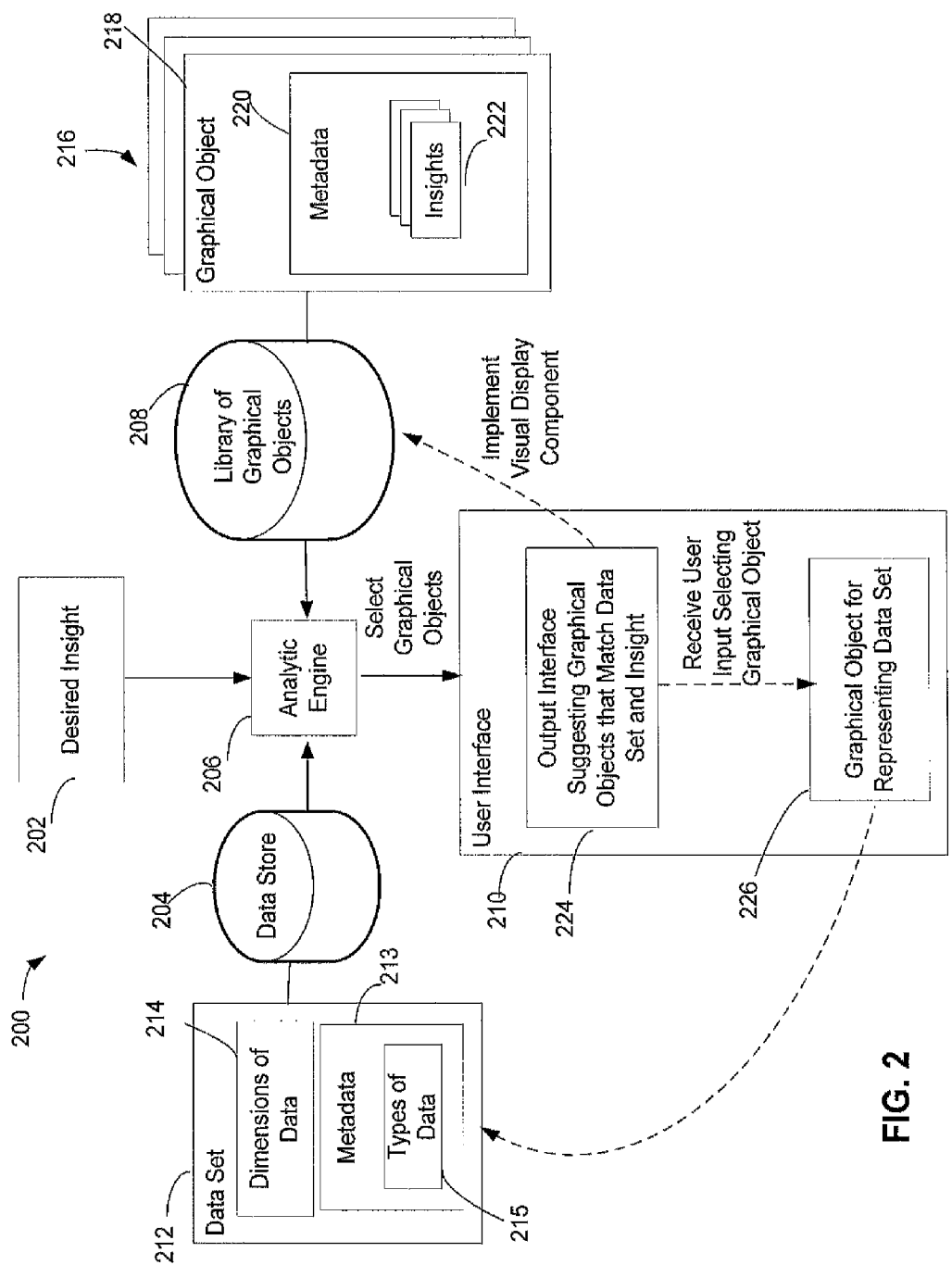
FIG. 2 is a schematic diagram of a system for selecting graphical objects to provide a desired insights when used to represent a portion of the data set.

FIG. 2 is an illustrative diagram of a system 200 for selecting graphical objects based an insight 202 that the user desires to gain from a data set. The system 200 includes a data store 204, an analytic engine 206, a library of graphical objects 208 and a user interface 210.

The data store 204 includes any suitable sets of data. Data set 212 may include metadata 213 defining parameters associated with the data set. For example, metadata 213 of data set 212 includes information on how data may be organized or presented. Metadata 213 may also include information 215 on different types of data included in data set 212. Aspects of the data set 212 may be categorized by dimensions of data 214. In an example, for sales data collected by a donut shop, various dimensions of the data may include flavors of donuts, respective fat content of each flavor and respective number of sales and time of the sales (e.g., months) of each flavor. In some cases, one or more dimensions of the data set may be variable such that values in the variable diversions may be changed by user input. Aspects of the data set 212 may be displayed and/or operated upon through a graphical object on a user interface 210.

The library of graphical objects 208 may include multiple graphical objects 216. Each graphical object 218 from graphical objects 216 may be associated with suitable metadata 220. Metadata 220 may identify one or more insights 222 that may be revealed from representing data using graphical object 218.

The graphical objects may be of any suitable formats. In some embodiments, the library of graphical objects 208 may include graphical objects of different geometries and shapes. Also, in some embodiments, the graphical objects may comprise interactive components that, in response to user input, may perform one or more operations on the data. Those operations may change the data or may be evaluative in nature, producing an output without changing the data. Graphical objects may be created through any tool suited for graphics generation and manipulation (e.g., MICROSOFT EXPRESSION® Studio, MAXON Cinema 4D). Each graphical object may be associated with information (e.g., metadata) that comprises an insight that is likely to be revealed from representing data using this graphical object. Visual characteristics of the graphical objects, a type of the desired insight as classified in an insight taxonomy, a type and dimensions of data to be analyzed and other factors may be used in selecting the graphical objects likely to reveal the desired insight.

Any other suitable graphical objects may be provided in the library 208. In some embodiments, graphical objects are stored as a library of components accessible to a system for matching one or more graphical objects to an insight desired by the user.

The system 200 includes a computerized tool such as the analytic engine 206 for analyzing graphical objects in the library 208 in conjunction with desired insight 202 that a user desires to gain from representing data set 212. When desired insight 202 is identified, analytic engine 206 may select one or more graphical objects adapted to present the data in a way likely to reveal the desired insight. The analytic engine 206 may be a single component executed by one or more processors or may encompass more than one component executed by the processors. The desired insight may be revealed using a selected graphical object in a number of ways. For example, appearance of the selected graphical object may be modified to reveal the desired insight. This may occur by changing one or more visual characteristics of the selected graphical object that may be controlled via the data set being analyzed. Furthermore, the selected graphical object may be capable of receiving user input indicating a change in a portion of the data set so that effecting the change reveals the desired insight.

The desired insight 202 may be identified in different ways. In some embodiments, the desired insight may be identified explicitly, by receiving user input indicating the desired insight 202. Additionally or alternatively, the desired insight may be inferred from a number of factors, without being explicitly indicated by the user. For example, the desired insight 202 may be determined based on an inference from prior interaction with the data set 212 by the user or other users, from prior interaction with similar data sets, from insights that this or other users have previously desired to gain from the data set 212 or other data sets, etc.

To select graphical objects that are likely to reveal a desired insight on the data set, the analytic engine 206 may apply a set of rules that allow determination of which graphical objects can represent the data set in such a way. The selection may be based on a type of the data set, visual characteristic(s) of the graphical objects or on other factors. For example, the analytic engine 206 may step through the metadata 220 of the graphical objects 216 and determine which graphical object (s) may be used to reveal the desired insight 202. The metadata 220 may comprise one or insights 222, and the graphical object 218 may be selected when one or insights 222 match the desired insight 202. Additionally, the analytic engine 206 may analyze the metadata 213 of the data set 212 to determine which graphical object(s) may be used to represent the data set 212 to reveal the desired insight 202.

The analytic engine 206 may select a number of graphical objects that can be used to represent the data set 212 to reveal the desired insight 202, resulting in a display of the selected graphical object(s) on an output interface 224 of the user interface 210 as suggestions (e.g., on a graphical menu) for a user to choose which graphical object(s) to implement. When a graphical object is selected and implemented, the user interface 210 may present the graphical object 226 on a display for suitable presentation and/or manipulation of the data. Accordingly, upon receiving input, for example, through the user interface, the selected graphical object 226 may be used to access and modify certain items of data in the data set 212 to reveal the insight 202.

Figure 3:
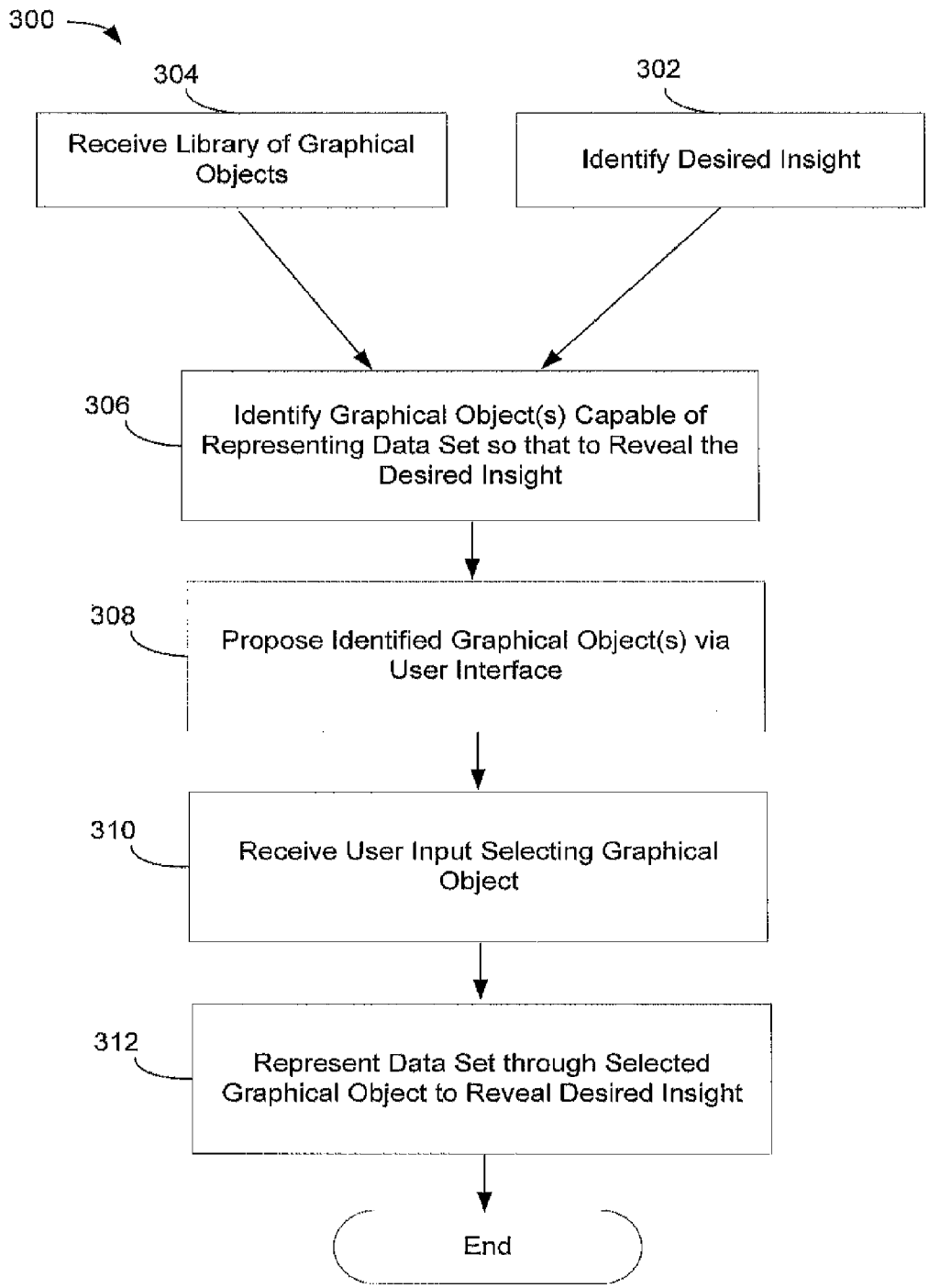
FIG. 3 is a flow chart of an embodiment for proposing graphical objects to provide a desired insights when used to represent data.

FIG. 3 represents a flowchart of a process 300 for a computing system to select a graphical object that can be used to represent a data set so that a desired insight is revealed. The process 300 may begin in any suitable way. For example, a user initiated command communicated through a user interface of a computing system may be received. At block 302, the system may identify a desired insight. At block 304, the system may receive a library of graphical objects having the ability to represent and manipulate data so that to reveal the desired insight.

The desired insight may be identified at block 302 in any of a number of ways. For example, user input may be received expressly indicating the desired insight. In some embodiments, a computer-based inference may be utilized to identify one or more insights that the user may desire to obtain from analyzing the data set. The system may determine a desired insight based on user's prior interaction with the data set, characteristics of the data set, prior interaction with similar data sets, insights that this or other users have previously desired to gain from the data set or other data sets and in other suitable ways. The system that infers the desired insight may also employ an insight taxonomy in which insights are classified in accordance with their types into a hierarchy. The desired insight identified using the computer-based inference may be dynamically utilized to select graphical objects suitable to represent the data set so that to reveal the desired insights. In some embodiments, when more than one desired insight is identified using the computer-based inference, such insights may be proposed to the user for user's selection.

A data set to be analyzed may become accessible to the system either explicitly or implicitly. For example, a user may provide explicit input to a user interface for loading the data set into the system. Though, in some cases, the data set may be readily available to the system and may be automatically accessed without user intervention whenever an indication is made that a particular data set is to be employed. Similarly, a library of graphical objects or other suitable collection of graphical objects may become accessible to the system either via explicit user input or may be automatically accessed.

At block 306, a computerized tool (e.g., analytic engine 206 in FIG. 2) may analyze the library of graphical objects received at block 304 and determine which graphical object (s) may be capable of representing the data set to reveal the insight. For example, the computerized tool may analyze metadata associated with each graphical object and determine whether the metadata indicates that the graphical object can represent the data set in a way that is likely to reveal the desired insight.

The computerized tool may identify which graphical objects may be capable of representing the data set to reveal the desired insight based on a number of factors. The computerized tool may analyze metadata of graphical objects in the library of graphical objects and match one or more insights in the metadata that can be revealed by representing data using the graphical objects with the insight that is identified to be desired by the user.

In some embodiments, the graphical objects may be identified based on a type of the desired insight. The type of an insight that a user may desire to gain from analysis of the data set may be represented in an insight taxonomy. Graphical objects may also be classified in accordance with the insight taxonomy. Accordingly, the computerized tool may access the insight taxonomy to select from the taxonomy a graphical object classified in the taxonomy in the same way as the desired user's insight.

Table 1 provides an example of types of insights that can be revealed from analysis of data. The first column of the table indicates the types of the insights, such as "Narrowing and Elaboration," "Differentiating," and "Ensembling." An insight of a certain type may encompass certain insights that may form levels of a hierarchy of the insights in the taxonomy. For example, Table 1 illustrates that the "Differentiating" type of an insight ("Level 1") may be associated with a lower level ("Level 2") "Rank by complex criteria" insight that, in turn, may comprise more specific ("Level 3") insights, such as, in this example, "Maximize merit," "Satisfy constraints," and "Analyze trend" insights. Thus, for example, if an insight on a data set comprises differentiating among items within the data set, a more specific insight may be differentiating by ranking the items by certain criteria. The ranking may further encompass analyzing a certain trend within the data set.

TABLE 1

Exemplary Insight Taxonomy.

Types of Insights

| Level 1 | Level 2 | Level 3 | Examples |
|---|---|---|---|
| Narrowing & Elaboration | | | |
| | Filter/Exclude | | |
| | Find similar | | Cameras with similar features<br>Stocks matching this stock's breakout pattern |
| | Find similar by relationships | | Find housing locations with similar demographics<br>Find music that most friends are listening |
| Differentiating | | | |
| | Rank by attributes | | |
| | Rank by complex criteria | | |
| | | Maximize merit | Houses best located for work + school + gym<br>Cell phone plans, with lowest effective cost for user's usage/renewal pattern |
| | | Satisfy constraints | Camera/lens combinations within budget<br>Evening outfit within fashion rules |
| | | Analyze trend | Locations where foreclosure rate is easing<br>Project likely house value in 5 years |
| | Compare instances | | |
| Ensembling | | | |
| | Pick a subset from larger set | | |
| | | Seed a plan | Create a meal plan around single recipe |
| | | Configure | Camera/lens/filters for sports photography |
| | Generate alternative plan/set | | See multiple evening dress ensembles within a budget |

A type of a desired insight that a user desires to obtain from a data set may be compared to types of insights that graphical objects in the library of graphical objects are capable of revealing when representing data. Graphical objects may be selected based on a match between the type of the desired insight and types of insights that the selected graphical objects can reveal by representing the data set.

In some embodiments, the selection of graphical objects may be based on visual characteristics of the graphical objects and dimension of a data set being analyzed. For example, graphical objects may have visual characteristics that may change in appearance when representing certain data. In the data set being analyzed, at least one dimension of the data may be suitably varied. The data set, or some portion of the data set, may be represented using an appropriate graphical object to reveal the desired insight. In some embodiments, the portion of the data set may comprise one or more dimensions of the data set. Thus, the identification of the graphical objects at block 306 may comprise comparing the one or more dimensions of the data set to capabilities of the graphical objects to represent these dimensions to reveal the desired insight.

In some embodiments, a comparison of aspects of the data set and graphical objects may involve analyzing whether the graphical objects can support different types of variation appropriate for certain dimensions of data. Various dimensions of data may take on certain forms, such as for example, continuous data, discrete data, enumerated data presented as a list of choices, data kept within a particular boundary-defined range, or combinations thereof.

In some embodiments, graphical objects that are likely to reveal a desired insight on a data set may be identified based on whether the graphical objects are capable of receiving user input for manipulating the data set. Accordingly, the identification of the graphical objects at block 306 may comprise comparing one or more dimensions of the data set to capabilities of the graphical objects to accept, through a graphical user interface, user input specifying variation along those dimensions. In some embodiments, the graphical objects that are capable of receiving user input for manipulating the data set may further be capable of receiving user input specifying certain constraints with respect to a way in which the data set is represented using the graphical objects. The constraints may also be applied to the visual characteristics of the graphical objects to result in an updated representation of the data set through the graphical objects.

At block 308, the system proposes the one or more identified graphical objects as suggestions to the user for how the data set or a portion of the data set may be represented to reveal the desired insight. Graphical objects may be proposed by any suitable method, for example, through a graphically interactive display of a user interface. For instances where a plurality of graphical objects are proposed on a graphically interactive display of a user interface (e.g., on a menu), graphical objects may be proposed according to a ranked order where graphical objects that are more likely to reveal the desired insight are suggested before graphical objects that are less likely to reveal the desired insight.

At block 310, the system may receive a user input selecting a graphical object of the one or more proposed graphical objects. The user input may be received in any suitable manner, which may depend on a way in which the graphical objects are proposed to the user. For example, the user input may comprise a selection of a graphical object from a menu.

At block 312, the selected graphical object may be implemented to represent a suitable portion of the data set to reveal the desired insight. An insight may be revealed from representing a data set or a portion of the data set using the graphical objects. By observing the data set, the user is likely to obtain the desired insight. For example, the graphical object may present the data set such that a trend in the data set, identification of a correlation between a portion of the data set with other portion of the data set, determination of a similarity between a portion of the data set and other portion of the data set or determination of a difference between a portion of the data set and other portion of the data set can be readily observed. Any other suitable insights may be revealed as embodiments of the invention are not limited in this respect.

In some embodiments, the graphical object is provided on a graphical user interface for a user to interact with the data set through the graphical object. The graphical object may be suitably manipulated by receiving user input indicating changes in representing the data set or variations in analyzing the data set.

The process 300 ends in block 312 upon termination of the process for selecting a graphical object though in embodiments in which a user may interact with the data set through manipulation of the graphical object, processing at block 312 may last until the user has completed interaction with the graphical object. Moreover, though FIG. 3 illustrates the processing ending, FIG. 3 may be regarded as one iteration of an interactive process. Upon completion of the indicated process, a user may repeat all or portions of the process, such as by selecting a different suggested graphical object, modifying the desired insight, or changing the data set.

Figure 4:
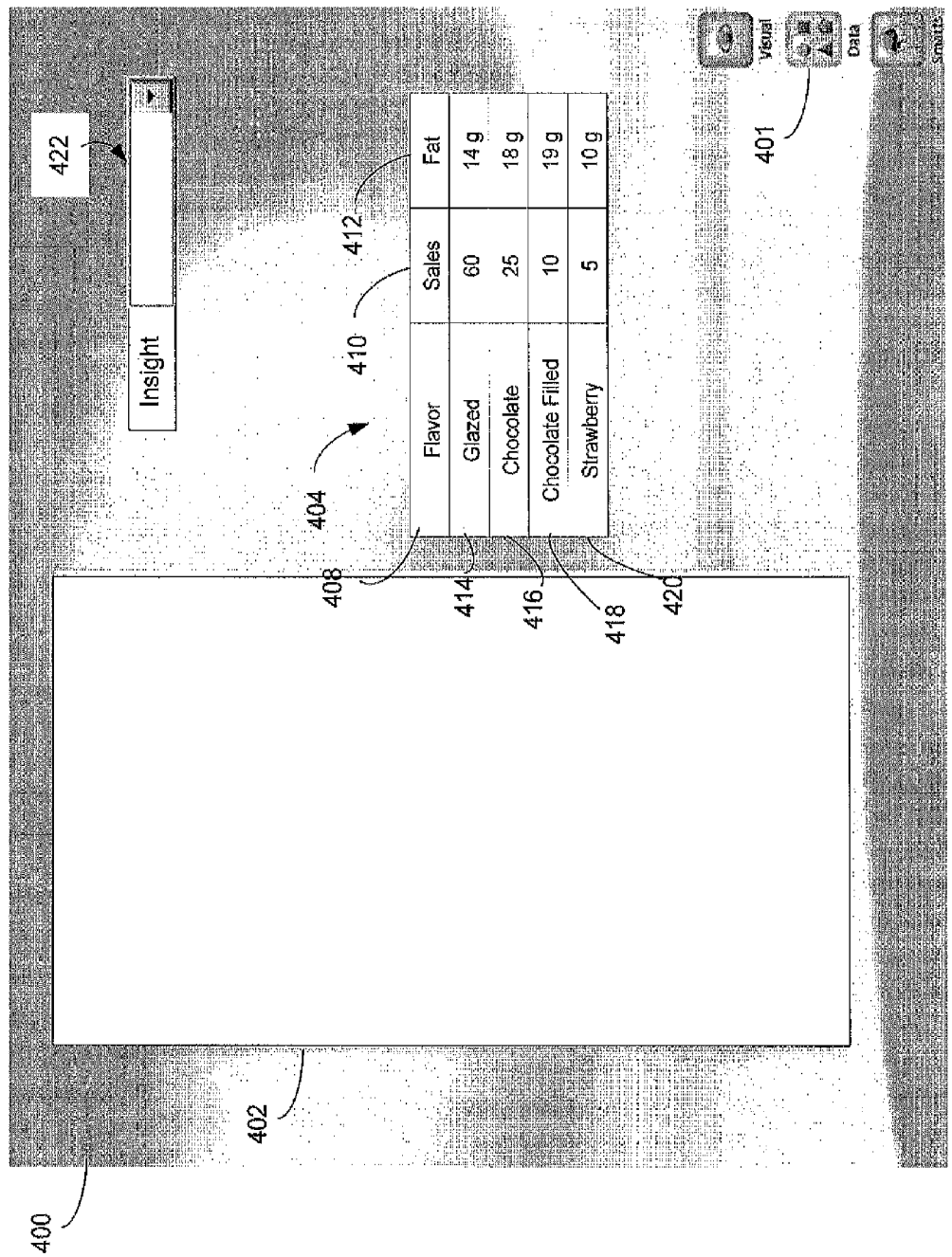
FIG. 4 is an illustration of a user interface through which user input indicative of a desired insight is received.

In some embodiments, user input may be received identifying a desired insight. FIG. 4 illustrates an example of a user interface 400 through which user input identifying a desired insight may be received. A graphical object may then be selected for representing a data set so that to reveal a desired insight on a canvass 402.

In FIG. 4, a data set such as donut sales data for visual representation through a graphical object may be received in a suitable way. For example, the data set may be loaded via suitable control, such as control 401 in FIG. 4.

The data set may comprise different portions which are, in this example, dimensions of the sales data. A chart 404 depicts dimensions of the data set, for example, sales data 410 reported from a donut shop of different flavors 408 of donut, each flavor of donut having a fat content 412. A listing of flavors 408 of donuts and the respective sales 410 and fat content 412 for each flavor of donut is provided. As shown in the example, row 414 shows that 60 million in revenue was reported from sales of the glazed donut having 14 g of fat, row 416 shows that 25 million in revenue was reported from sales of the chocolate donut having 18 g of fat, row 418 shows 10 million in revenue was reported from sales of the chocolate filled donut having 19 g of fat, and row 420 shows 5 million in revenue was reported from sales of the strawberry donut having 10 g of fat. It should be appreciated that the data set illustrated in the chart 404 may comprise any other data (e.g., donut sales by months, years etc.) that are not shown for the sake of simplicity.

In the representative embodiment, user input with respect to a desired insight may be received by selecting the insight from a number of available insights. FIG. 4 shows that a drop-down menu 422 may be presented to receive user input selecting the desired insight. User input may be received in any other suitable way. Insights in the drop-down menu 422 that are presented for the user's selection may be identified in the insight taxonomy either based on express indication (i.e., user input) or via inference by a computer-based tool. In this example, a set of insights presented for the user's selection may comprise either all insights in the insight taxonomy or a portion of the insights whose types are classified in accordance with the taxonomy. The portion may be selected, for example, based on one or more parameters of the data set to be analyzed or based on other factors. This set of the insights may then be displayed on a user interface so that user input may be received with respect to selection of one of the suggested insights as the desired insight for data representation.

Figure 5:
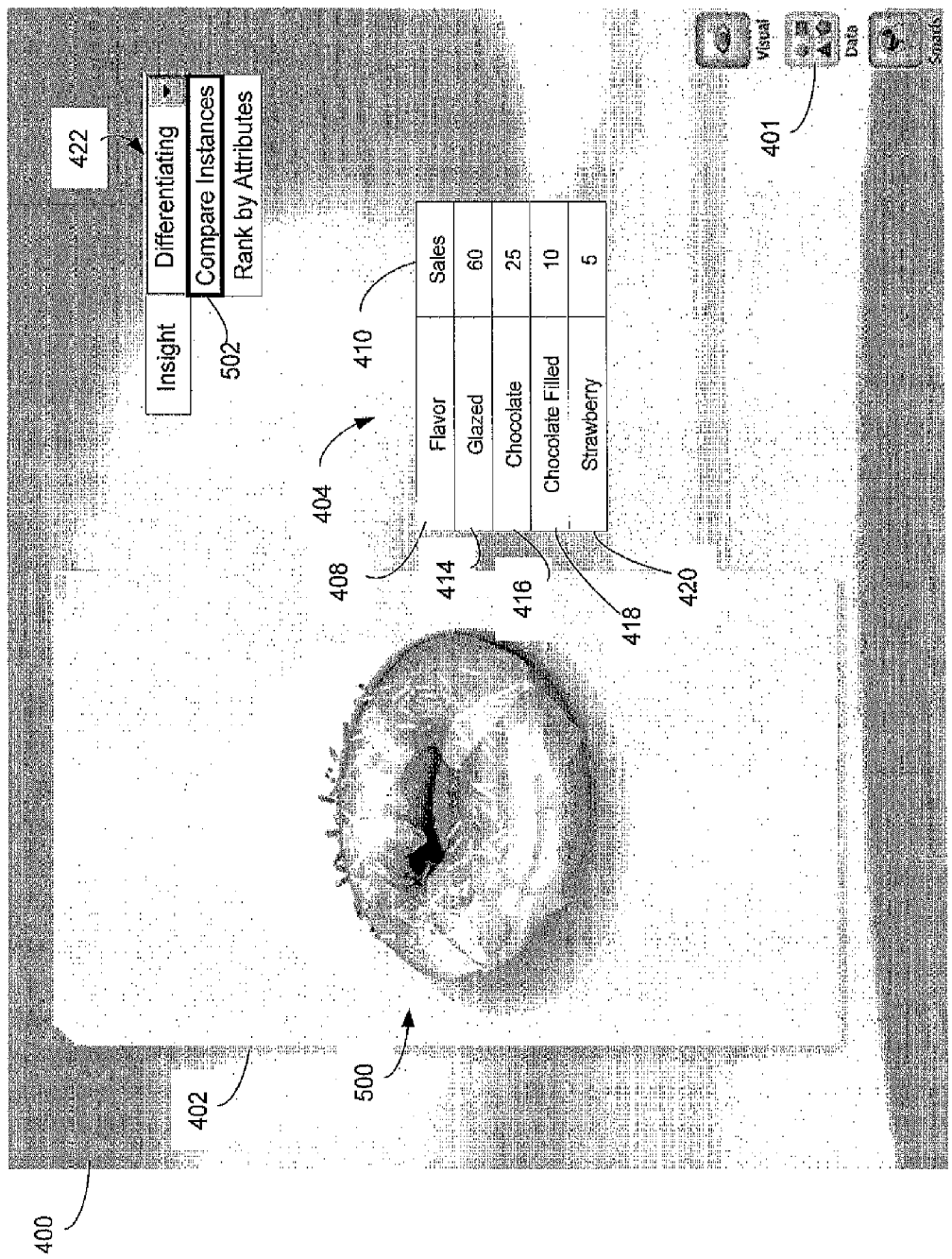
FIG. 5 is an illustration of the user interface of FIG. 4 displaying a graphical object selected based on the desired insight.

FIG. 5 illustrates an example where user input was provided to specify a desired insight 502. In this example, a set of insights are presented to the user for user' selection via the drop-down menu 422. The insights comprise an insight of a type "Differentiating" from the taxonomy. The "Differentiating" may be linked to one or more lower level insights in the taxonomy. Accordingly, when user input selecting this insight is received, the drop-down menu 422 may suggest more specific insights at a lower level of hierarchy that are linked to the "Differentiating" insight. FIG. 5 shows that "Compare Instances" and "Rank by Attributes" insights may be presented for the user's selection. The user input indicative of a selection may be provided, for example, via manipulating a pointer positioned by user operation of a computer mouse or other suitable pointing device, or in other suitable manner.

In addition to providing input indicative of a desired insight, the user may also select one or more dimensions of the data set shown in the chart 404 for representation through a graphical object to be selected based on the identified desired insight. Accordingly, in this example, user input with respect to selection of two columns of the data set—flavors 408 of donut and sales data 410—may be selected.

In response to the user's selection of the "Compare Instances" insight 502 from the drop-down menu 422, as indicated by a bold frame in FIG. 5, a computerized tool may select one or more graphical objects capable of representing at least one portion of the data set so that the user gains the desired insight. As discussed above, the selection may be performed in a number of ways and based on different factors. In some embodiments, the graphical object may be selected based on analyzing metadata on graphical objects in a store (e.g., the library of graphical objects 208 in FIG. 2). The analysis may comprise matching at least one insight that can be revealed from representing data using the graphical object with the identified insight that the user desires to gain from representing at least one portion of the data set.

In embodiments where a type of the graphical object has been classified according to an insight taxonomy, graphical objects may also be classified in accordance with the insight taxonomy. Thus, selecting a graphical object in accordance with the desired insight may entail selecting graphical objects that are classified in the insight taxonomy in the same way as the desired user's insight.

In some embodiments, selecting the graphical object may be based on one or more parameters of the data set to be analyzed. In this example, types of data in the data set, such as continuous sales and fat content data and discrete flavor data, may be taken into consideration.

Further, in some embodiments, visual characteristic(s) of the graphical object may be employed in selecting one or more graphical objects in accordance with the desired insight. For example, a suitable component (e.g., analytic engine 206 in FIG. 2) may determine whether visual characteristics of the graphical object allow modifying appearance of the graphical object so that the appearance of the graphical object reveals the desired insight. In some cases, this may comprise determining whether the graphical object is capable of receiving user input representing a change in at least one portion of the data set, where affecting the change may reveal the insight.

Regardless of a way in which one or more graphical objects are selected based on the desired insights, such graphical objects may be presented to the user as a suggestion for incorporating one or more of these graphical objects in a user interface configured for interaction with the data set. The selected graphical objects may represent in the user interface at least a portion of the data set so that the desired insight is revealed.

In the example of FIG. 5, in response to the user's selection of the "Compare Instances" insight 502 from the drop-down menu 422, the computerized tool may select a graphical object capable of representing at least one portion of the data set so that the user gains the desired. In this example, a graphical object selected in accordance with the desired insight comprises a graphical donut 500 that may depict data values representing sales of donuts by flavor sold so that a user may compare sales of different flavors of donuts by viewing the graphical object configured based on the data. In the example illustrated, the graphical donut 500 may be a single graphical object selected in accordance with the desired insight 502.

Visual characteristics of the graphical donut 500 may be used to represent the portion of the data set comprising flavors 408 of donut and sales data 410 so that to reveal the desired insight 502 entitled "Compare Instances." The graphical donut 500 has such visual characteristics as dough, icing or sprinkles. Each of the visual characteristics may be modified in accordance with values in the respective portion of the data set so that the comparison of sales of donuts by flavor is revealed.

In some embodiments, the graphical donut 500 may be capable of receiving user input with respect to selection of this object for data representation. Accordingly, the user may provide input indicating that the graphical donut 500 is not a graphical object that the user would like to use. In response to such user actions, one or more alternative graphical objects may be proposed for user's selection.

Figure 6:
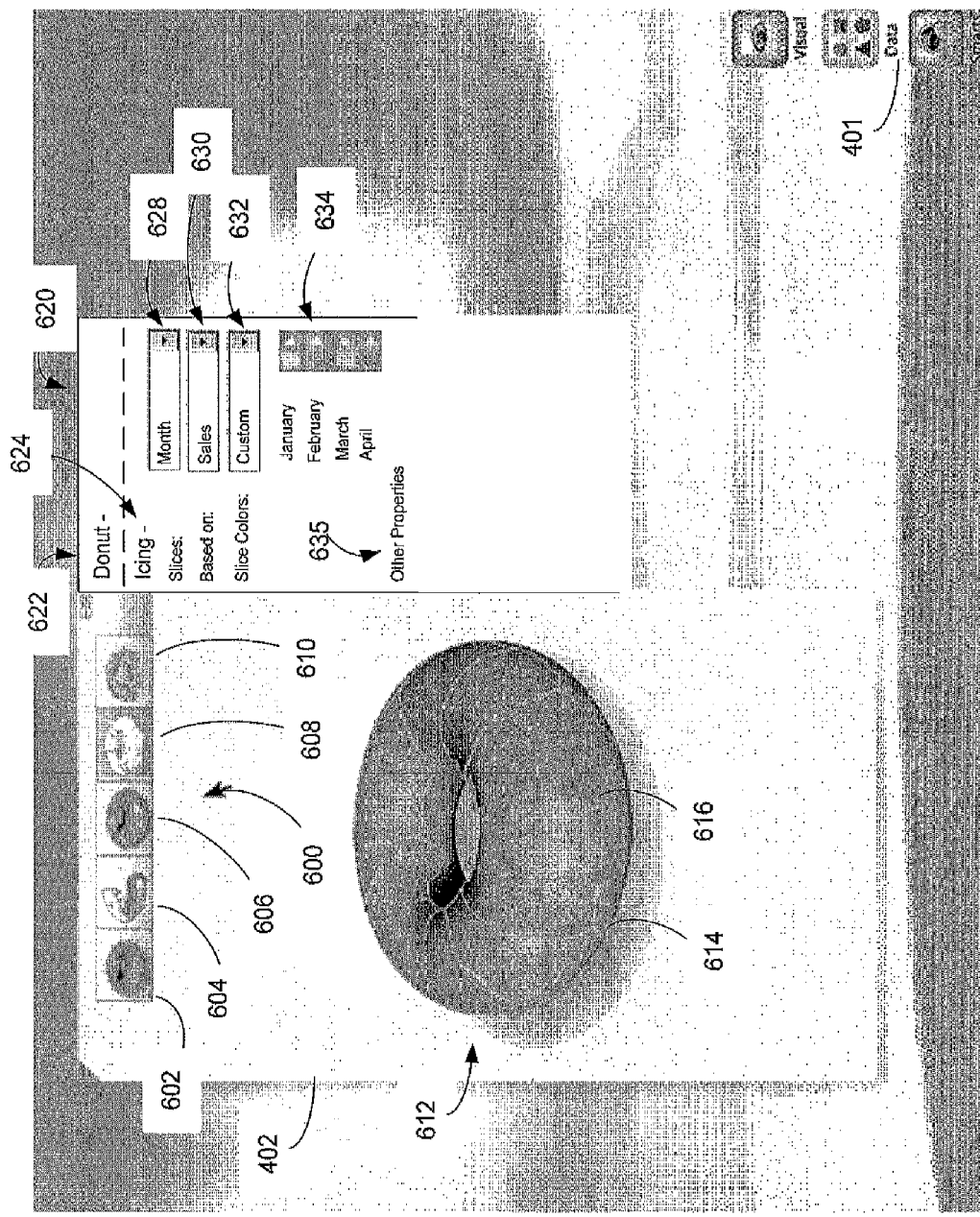
FIG. 6 is an illustration of the user interface of FIG. 4 displaying a collection of graphical object suggested to a user based on the desired insight and displaying a graphical object selected by the user.

In some embodiments, a number of graphical objects may be proposed for the user to select. FIG. 6 illustrates an example where a number of graphical objects may be selected that fit the desired insight. The selected graphical objects may be presented to the user as a suggestion to incorporate one or more of these graphical objects into the user interface to represent the data set.

In FIG. 6, similar to the example illustrated in connection with FIG. 5, a desired insight, which may be identified based on user input, may be the "Compare Instances" insight 502. Accordingly, a number of graphical objects may be selected so that to reveal this desired insight—i.e., to show donut sales by flavor.

In FIG. 6, a collection of graphical objects 600 may be proposed for the user to select. The collection 600 of the proposed graphical objects 602, 604, 606, 608 and 610 is presented on the canvas 402 for a user to choose. The graphical objects may be proposed in a form of graphical boxes each depicting an image of a corresponding graphical object. A graphical box may be capable of receiving input indicating selection of a corresponding graphical object. The selection results in implementation of the selected graphical object on the canvass 402.

As shown, in this example, the graphical box corresponding to the graphical object 608 is darkened indicating that the user selects this graphical object. Accordingly, graphical donut 612 is displayed on a main portion of canvas 402. Graphical donut 612 corresponds to selection of graphical object 608.

In some embodiments, appearance of one or more visual characteristics of a graphical object may be modified to represent a data set through the graphical object to reveal the insight. Accordingly, in the example illustrated, different graphical objects from the collection of graphical objects 600 may be selected for different portions of the data set.

Graphical donut 612 of FIG. 6 has visual characteristics that enable graphical donut 612 to display data through dough of the donut and the icing. Accordingly, for example, graphical donut 612 is suitable for representing total sales reported at the end of a year, wherein the sales reported at different points throughout the year (e.g., monthly, quarterly) are displayed via certain types of icing to represent the break down of those reported sales.

Accordingly, FIG. 6 shows that graphical donut 612 revealing the desired insight comprising demonstrating sales by flavor data via the visual characteristics of the graphical object (e.g., the dough and the icing of the donut). Thus, graphical donut 612 includes the dough 614 and colors of icing 616 segmented into twelve different regions. Each of the twelve regions corresponds to sales reported for each month of the year where the area occupied by each segment of icing 616 is indicative of the amount of sales reported for that month. For example, when the area of a first segment of icing corresponding to a first month is depicted to be greater than the area of a second segment of icing corresponding to a second month, the sales reported at the end of the first month is interpreted in the sales representation to be greater than the sales reported at the end of the second month. Or, in another example, the color of icing displayed on a graphical donut may indicate a certain amount of sales. For instance, chocolate icing displayed for one segment may be indicative of greater sales reported for one particular month as compared with strawberry icing displayed for another segment, indicating sales reported for a different month.

In some embodiments, the selected graphical object may be capable of receiving user input so that the user can specify certain constraints that can be used to reveal the desired insight with respect to different portions of the data set. In the example illustrated, the data set may be further manipulated through visual characteristics of the graphical donut 612.

Accordingly, additional visual display components may be provided to receive user input to manipulate the data set represented through the graphical object. As shown in FIG. 6, a graphical manipulation tool 620 illustrates an example of a visual display component where various parameters of visual characteristics of the graphical donut 612 may be adjusted. For example, "Donut" adjustment box 622 may be manipulated by a user for the system to modify parameters of data representation through the donut itself and/or the data that is represented by the donut. "Icing" adjustment box 624 may permit a user to provide input for the system to modify parameters of how the icing of the graphical object is used to display data and/or the data itself represented by the icing.

Graphical donut 612 is capable of receiving user input to change an appearance of one or more of its visual characteristics. FIG. 6 illustrates that features of the icing 616 may be readily adjusted through modification of parameters in regions provided by "Icing" adjustment box 624. "Icing" adjustment box 624 includes a "Slices" region 628 that provides a user with the ability to provide input for the system to adjust what dimensions of data are represented by the segments of icing depicted in the graphical donut and/or how data represented by segments of icing may be modified. A "Based on" region 630 permits a user to provide input as to what type of data the icing generally represents and/or what type of data may be modified through representation by the icing. The "Slice Colors" region 632 allows a user to determine what colors will represent certain slices of icing through the visual rendering. An "Other Properties" region 635 is further provided where more options for adjusting parameters of the icing will appear upon selection of this region.

In the example shown, the "Slices" region 628 is currently given a "Month" setting in the drop down box and the "Based on" region 630 is set to a "Sales" setting. The "Month" and "Sales" settings result in the icing 616 of the graphical donut 612 representing sales data reported by the business at the end of each month. In some cases, the "Slices" region 628 may be given a different setting, for example, an annual or quarterly setting. Similarly, the "Based on" region 630 may also be set to a different parameter besides sales, for example, inventory or organizational structure. Thus, the "Based on" region 630 may be set to reveal sales of a particular donut (e.g., glazed, chocolate, chocolate-filled or strawberry), rather than sales of all donuts, so that it can be determined which donuts are more or less popular.

The "Slice Colors" 632 region denotes the colors of each slice to be "Custom" selected. Hence, color selection region 634 is provided adjacent to the "Slice Colors" region 632 for a user to select what colors in the graphical rendering will denote which segments in the graphical donut 612 representing months of the year. In some cases, the "Slice Colors" region 632 may be given a setting other than "Custom," for example, a "Default" setting where colors for each segment that represent months in the year may be automatically set to default colors determined by the system. Or, in another example, if the "Slices" region 632 is set to an "Annual" setting (rather than by "Month"), then for sales data reported from the past few years, the color selection region 634 may be reorganized so that selection of segments in the graphical donut 612 represent past years as opposed to months.

Upon receiving user input for the above settings, the system retrieves the dimensions of data from the data set for mapping to the corresponding visual characteristic so that to reveal the desired insight. Values of parameters that modify the appearance of each visual characteristic are set based on the values within each dimension. As a result, the graphical object is rendered according to the parameter values using known techniques for displaying objects with adjustable characteristics where data represented by the objects may also be manipulated through a user input.

FIGS. 4-6 describe selecting a graphical object in accordance with a desired insight for representing a data set or portions of the data to reveal the desired insight. Graphical objects of different types may be selected in various embodiments.

Figure 7:
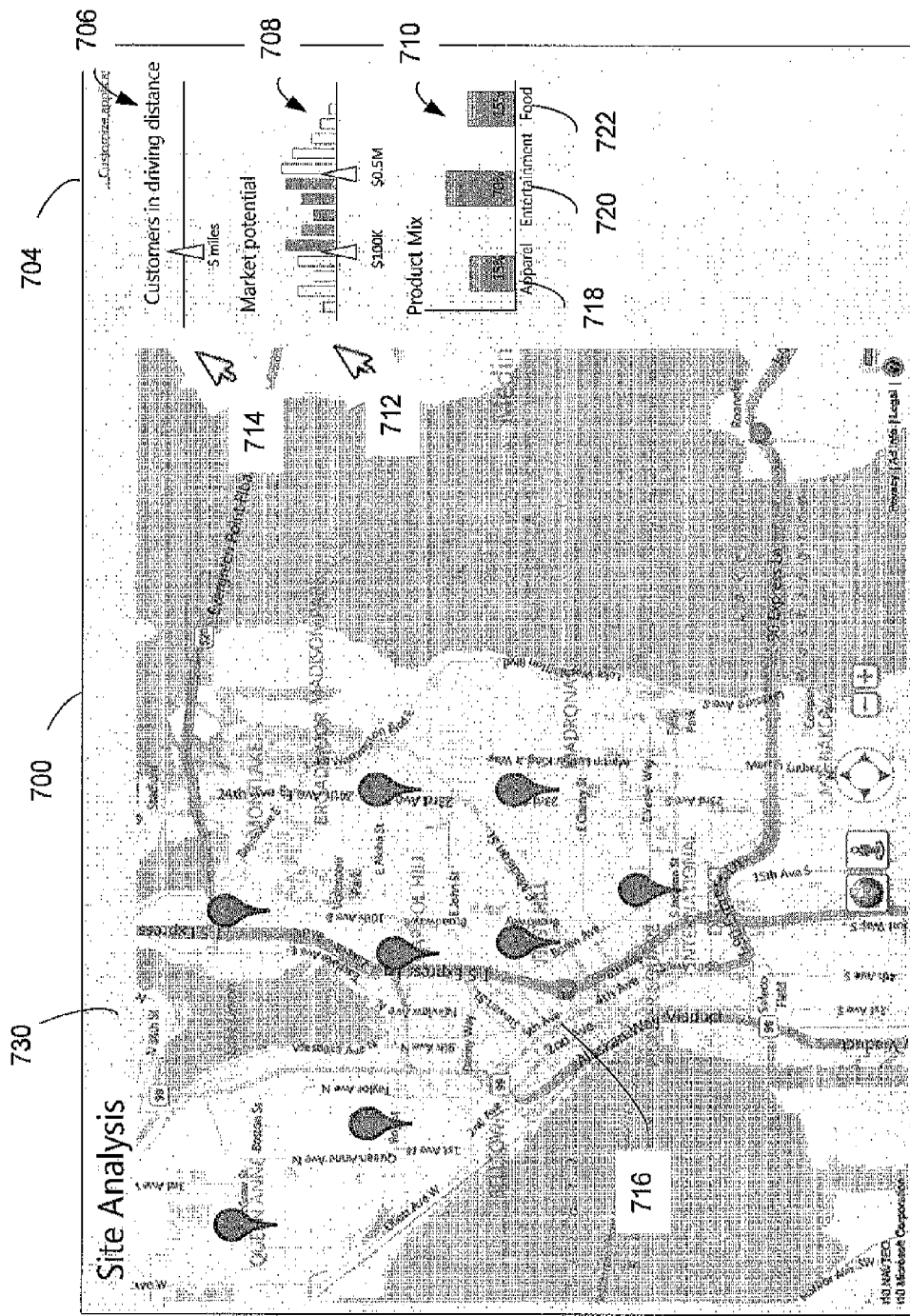
FIG. 7 is an illustrative example of a user interface where desired insights are s inferred and graphical objects selected based on the identified insights are presented on the user interface.

FIG. 7 illustrates another example of selection of graphical objects in accordance with a desired insight. In this example, a data set to be analyzed may comprise data on multiple locations. A user may be presented with a graphical object suited for representing the data set so that to reveal the desired insight.

In the example illustrated in FIG. 7, a computerized tool may first infer a desired insight comprising comparing instances of items in the data set. In addition, a user input may be received indicating such an insight. The desired insight may be identified from an insight taxonomy. For example, the "Compare Instances" insight may be selected from the insight taxonomy shown in Table 1. In addition, parameters of the data set (e.g., metadata 213 in FIG. 2) may be used in identification of the desired insight. In this example, the data set contains data about multiple geographic locations, supporting an inference that the inference relates to comparing locations.

In response to the identification of the desired insight, the computerized tool which may be any suitable component (e.g., analytic engine 206 in FIG. 2) may select a graphical object suited to represent the data set so that to reveal the desired insight. Accordingly, a graphical object such as a geographical map may be selected in accordance with the desired insight that is capable of representing the location data so that a user can readily differentiate among locations on the map.

In FIG. 7, a display region 700 of a user interface provides the map. The display region 700 may show on the map different items of the data set. The user may further desire to represent the data set so that different insights on the data sets are revealed.

The desired insights may be identified in a number of ways. In this example, the system may infer the desired insight heuristically. For example, the system may identify desired insights from user's interaction with the data and based on a type of data in the data set. Also, desired insights may be determined based on additional information that is available on each items in the data set, such as address, images, notes regarding the location, the agent representing the location and any other information. Furthermore, the system may have access to information relating to which insights are typically desired by users when users view location data through a map. As such, the system may utilize this information when determining one or more insights that may be desired to obtain from the data set by a current user.

The system may identify one or more desired insights from an insight taxonomy. As an example, a desired insight that may be identified in the taxonomy shown in Table 1 may comprise "Narrowing & Elaboration"/"Find similar by relationship." Such insight may comprise assessing a suitability of locations in the data set for starting a business at those locations. The computerized tool may then select graphical objects that can be used to represent the data set so that to reveal such insight.

FIG. 7 provides a screen snapshot of a user interface depicting graphical objects selected to reveal the "Narrowing & Elaboration"/"Find similar by relationship" insight on the data set. In this example, the relationship on which insight is desired may be geographic. Accordingly, the selected graphical object may be a map 730. Data points from a data set may be displayed as locations 716 on map 730. In this way, a user may view map 730 marked with locations 716 to gain an insight into geographic relationships between locations identified by data in the data set.

In some embodiments, an analysis tool may support more complex forms of relationship analysis. In this example, the user interface includes a visually interactive region 704, which presents to the user controls that may be manipulated by user input to filter or otherwise modify the data set depicted on map 730. Additionally, visually interactive region 704 may contain further graphical objects that display other aspects of the data set. These graphical objects also may be selected in accordance with one or more desired insights identified for a user. In this example, the selected graphical objects comprise a slider 706, a bar chart 708 and a bar chart 710 provided in the visually interactive region 704. The graphical objects 706, 708 and 710, either separately or in combination, may represent at least a portion of the data set in a way that is likely to reveal the desired insight.

It should be appreciated that the three graphical objects 706, 708 and 710 are shown in FIG. 7 by way of example only, as any number of graphical objects may be presented to the user. Furthermore, any other suitable graphical objects, if selected, may be presented to the user.

The user may provide input indicating a selection of one or more of the graphical objects 706, 708 and 710 that may aid in revealing a desired insight. FIG. 7 shows schematically by a pointer 714 that the user may select a graphical object such as the graphical object 708 entitled "Market Potential." Additionally or alternatively, the user may select the graphical object 706 entitled "Customers in driving distance" as shown schematically by a pointer 712. The selection may be done using a suitable pointing device or in any other manner. These graphical objects may be interactive, such that when selected, a user may manipulate aspects of the selected graphical object to provide input relating to a change in the data set.

In the example illustrated, the graphical object 708 entitled "Market Potential" may reveal the desired insight comprising identifying locations within the data set that have a certain market potential for having a business at those locations. In this example, the appearance of the graphical objects 708 may change when the display of this object is controlled by data in the data set. Graphical object 708 may be selected, for example to reveal an insight concerning market potential and a number of locations where such market potential may be achieved.

In FIG. 7, the graphical object 708 is interactive—it may receive user input and further filter information presented on map 730 based on the user input. In the example shown in FIG. 7, a lower bound and an upper bound may be set by the user to determine a range of interest of possible revenue (e.g., between $100,000 and $500,000 in monthly revenue, shown in FIG. 7). Here, heights of shaded bars shown within a range of interest indicate a number of locations in the data set with the degree of market potential at the particular values indicated. The higher the bar is depicted, the more sites there are that could potentially generate the amount indicated in monthly revenue. Market potential is also shown for a region outside of the revenue range of interest, depicted as unshaded bars. Though, in this example, only data points corresponding to the shaded bars are selected for display on map 730.

In response to user input received with respect to the graphical object 708 indicating a selection of a range of interest of possible revenue for a potential business site, proposed locations for the business may be provided in the display of the user interface.

In the example illustrated, in addition to selecting the graphical object 708, the user may select the graphical object 706. The graphical object 706 may help reveal an insight on a particular driving distance between one or more locations under consideration (e.g., for opening up a business) and potential customers. The graphical object 706 is shown as an interactive control that can receive user input specifying a parameter comprising a particular driving distance. A value of the parameter may be adjusted based on user input and, for example, may specify the position of a marker on the graphical object 706. Accordingly, the graphical object 706 operates as a slider and data on customers likely to shop at a store if located at a particular site may be filtered based on a constraint set by adjustment of the marker on the graphical object 706. Accordingly, the position of the slider of graphical object 706 may influence which data from the data set is used to compute market potential in graphical object 708.

In this example, graphical objects 706 and 708 may be used in combination to reveal a desired insight. Accordingly, in the example shown in FIG. 7, locations 716 of potential business sites having a market potential within the range of $100,000 and $500,000 in monthly revenue based on customers within a 5 mile driving distance are shown on map 730. These locations 716 allow for the user to obtain the desired insight on which locations in the data set are suitable for establishing a business.

The "Product Mix" graphical object 710 presents information in the form of a bar chart that represents distribution of product types that are sold within a particular geographical region. This graphical object presents a distribution of various types of products that may be sold in the store for which a site is being sought.

As shown in FIG. 7, the graphical object 710 includes a bar 718 representing a percentage within a geographical region of interest that sells apparel to be 15%; a bar 720 that illustrates a percentage within the geographical region of interest that is focused on entertainment to be 70%; and a bar 722 that represents a percentage within the geographical region of interest that sells food is 15%. The graphical object 710 may receive user input indicating variations in heights of the bars 718, 720 and 722. When one of the bars 718, 720 and 722 is raised or lowered, the other two bars may dynamically change.

Embodiments described herein provide a way to identify an insight that a user desires to obtain from a data set. Graphical objects that are capable of representing the data set in a way that reveals the desired insight may be selected based on the desired insight and suggested to the user. Accordingly, user experience may be improved because the user may be able to analyze data in a more efficient manner and obtain information that reflects a reason for the user's analyzing the data.

It should be appreciated that techniques described herein are not limited to any particular graphical objects and may utilize different types of visual objects that can represent at least a portion of a data set. Accordingly, any suitable graphical objects or visual display components of a graphical object may be selected in accordance with a desired insight. The visual display components may have any visual characteristics suitable for representation of data. In some scenarios, the visual display components may be interactive and may therefore receive user input with respect to parameters that influence representation of different aspects of the data set and provide output reflecting changes effected via the user input.

It should also be appreciated that the techniques described herein are not limited to any particular way in which a desired insight may be identified. Thus, the desired insight may be identified based on an express indication—e.g., user input. Another way to identify the desired insight comprises inference by a computer-based tool. Furthermore, the desired insight may be identified using a combination of express and implied indications, or in any other suitable manner. Furthermore, any suitable taxonomy of insights may be employed.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of operating a computing device to create a representation of a data set, the method comprising:
   with at least one processor:
      identifying, based on a computer-based inference derived by analyzing values of data in a data set being visualized, an insight that a user desires to gain from graphically presenting at least one portion of the data set, the insight being identified without explicit interaction by the user;
   selecting, at least one graphical object adapted to receive user input indicating a change in the values of the data in the at least one portion of the data set so that on effecting the change, the selected at least one graphical object reveals the insight using at least the changed values of the data in the data set, wherein the selection is performed based on a type of the data set and at least one visual characteristic of the at least one graphical object; and
   presenting to the user a suggestion for incorporating the selected at least one graphical object in a user interface configured for interaction of the user with at least the changed values of the data in the data set.

2. The method of claim 1, wherein identifying the insight comprises receiving user input indicative of the insight.

3. The method of claim 1, wherein identifying the insight comprises identifying a plurality of insights from at least other users who have previously desired to gain from the data set and then selecting the insight from the plurality of the insights based on the user input.

4. The method of claim 1, wherein the type of the data set comprises at least one of continuous or discrete data.

5. The method of claim 3, wherein:
   the at least one graphical object is associated with metadata comprising information on at least one insight that can be revealed from representing data using the at least one graphical object; and
   selecting the at least one graphical object comprises matching the at least one insight that can be revealed from representing data using the at least one graphical object with the identified insight that the user desires to gain from graphically presenting the at least one portion of the data set.

6. The method of claim 1, wherein:
the method further comprises selecting the at least one graphical object from a library comprising graphical objects, wherein each graphical object is stored in the library in association with information on an insight revealed by displaying data using the at least one graphical object.

7. The method of claim 1, wherein selecting the at least one graphical object comprises determining whether the at least one graphical object is capable of receiving user input representing the change in the at least one portion of the data set.

8. The method of claim 7, wherein selecting the at least one graphical object further comprises matching at least one parameter of the at least one portion of the data set with the at least one visual characteristic of the at least one graphical object.

9. The method of claim 1, further comprising:
in response to user input selecting the at least one graphical object, presenting the at least portion of the data set on the user interface through the at least one graphical object.

10. The method of claim 1, wherein the user input is provided by interacting with one or more displayed graphical components.

11. A computer system, comprising:
a storage device comprising a library of graphical objects, wherein each graphical object in the library is associated with an insight revealed from displaying data using the graphical object;
a data set of a type; and
at least one processor configured to:
identify a desired insight to be revealed from graphically presenting at least one portion of the data set, wherein a type of the identified desired insight is selected from one of multiple levels of a hierarchy of insights in an insight taxonomy, the insight being identified by presenting a portion of the insights from the multiple levels based on the data set, the hierarchy of the multiple levels being organized based on types of the insights, wherein at least two or more types of the insights have different levels of the hierarchy in the insight taxonomy;
identify in the library, based on the type of the data set and the type of the identified insight, at least one graphical object capable of representing the at least one portion of the data set so that the user gains the insight, the at least one graphical object being identified based on a comparison of the type of the identified insight and types of insights graphical objects in the library are capable of revealing, wherein the at least one graphical object is adapted to receive user input indicating a change in the at least one portion of data in the data set so that effecting the change reveals the desired insight based on at least the changed data, the at least one graphical object being identified from the graphical objects classified in the multiple levels of the hierarchy in the same way as the insights are classified in the insight taxonomy;
generate an output suggesting use of the identified at least one graphical object; and
in response to user input requesting use of the identified at least one graphical object, represent the data set using the graphical object via a graphical user interface.

12. The computer system of claim 11, wherein the insight comprises at least one of a trend in the data set, identification of a correlation between a first subset of the data set with a second subset of the data set, determination of a similarity between a third subset of the data set and a fourth subset of the data set or determination of a difference between a fifth subset of the data set and a sixth subset of the data set.

13. The computer system of claim 11, wherein the at least one portion of the data set comprises at least one dimension of variability of data in the data set.

14. The computer system of claim 11, wherein identifying the insight comprises identifying the insight based on a combination of an input from a user and an inference by a computer-based tool.

15. The computer system of claim 11, wherein identifying the insight comprises identifying the insight from at least one prior interaction with the data set via the graphical user interface.

16. The computer system of claim 11, wherein:
the graphical object comprises at least one visual characteristic representing the at least one portion of the data set, and
representing the data set using the graphical object comprises representing the at least one portion of the data set through the at least one visual characteristic so that the user gains the insight.

17. A method of interacting with a data set, the method comprising:
through at least one processor:
identifying an insight that a user desires to gain from graphically presenting at least one portion of the data set, the insight being identified, based on a computer-based inference derived using the data set, from one of multiple levels of a hierarchy of insights in an insight taxonomy;
selecting, based on the identified insight, a first graphical object corresponding to the one of multiple levels of the hierarchy, wherein the first graphical object reveals the insight;
selecting a plurality of graphical objects capable of changing appearance of the first graphical object, at least one graphical object in the plurality of graphical objects being capable of representing the at least one portion of the data set so that the plurality of graphical objects in combination aid in revealing the insight by the first graphical object, wherein the selection of the first graphical object is performed based on a type of the data set and at least one visual characteristic of the first graphical object, and the at least one graphic object is adapted to receive user input indicating a change in the at least one portion of the data set so that effecting the change reveals the identified insight by changing the at least one visual characteristic of the first graphical object;
presenting to the user a suggestion for incorporating the first graphical object and the plurality of graphical object in a user interface configured for interaction with the data set; and
in response to user input requesting use of the at least one graphical object, representing the at least one portion of the data so that the plurality of graphical objects in combination aid in revealing the insight by the first graphical object.

18. The method of claim 17, wherein:
the at least one graphical object is selected from a library comprising graphical objects, wherein each graphical object is stored in the library in association with information on at least one insight that can be revealed by displaying data using the graphical object.

19. The method of claim 18, wherein the graphical objects are stored in the library as organized in accordance with a taxonomy of the graphical objects.

20. The method of claim 18, wherein selecting the first graphical object comprises matching the at least one insight that can be revealed by displaying data using the graphical object with the identified insight that the user desires to gain from graphically presenting the at least one portion of the data set.

\* \* \* \* \*